United States Patent [19]

Child

[11] Patent Number: 4,718,378
[45] Date of Patent: Jan. 12, 1988

[54] TRANSMISSION COUPLING

[75] Inventor: Robin E. Child, Holmby House, England

[73] Assignee: Concentric Pumps Limited, Birmingham, England

[21] Appl. No.: 892,998

[22] Filed: Aug. 1, 1986

[30] Foreign Application Priority Data

Aug. 14, 1985 [GB] United Kingdom ............... 8520351

[51] Int. Cl.⁴ .............................................. F01P 5/04
[52] U.S. Cl. ............................. 123/41.12; 416/169 A
[58] Field of Search ......................... 123/41.11, 41.12; 416/169 A; 418/61 B, 183, 188

[56] References Cited

U.S. PATENT DOCUMENTS

| 4,032,267 | 6/1977 | Miller | 418/61 B |
| 4,351,426 | 9/1982 | Bopp | 123/41.12 |
| 4,493,293 | 1/1985 | Paul et al. | 123/41.12 |

Primary Examiner—William A. Cuchlinski, Jr.
Attorney, Agent, or Firm—Charles O. Marshall, Jr.

[57] ABSTRACT

A cooling system for an I.C. engine includes a gerotor pump coupling a drive shaft 10 to the fan blades 20. The pump is arranged to self-prime when a by-pass passage 26 connecting the pump with the reservoir is closed by initial movement of the thermostat 34 displacing a tube 36 to close port 38. When primed, the gerotor set will drive the fan at an intermediate speed. Further movement of the thermostat displaces a spool valve 26 to take waist 24 out of register with transfer path 22 so that the pump locks up and the fan is driven at a higher speed.

2 Claims, 1 Drawing Figure

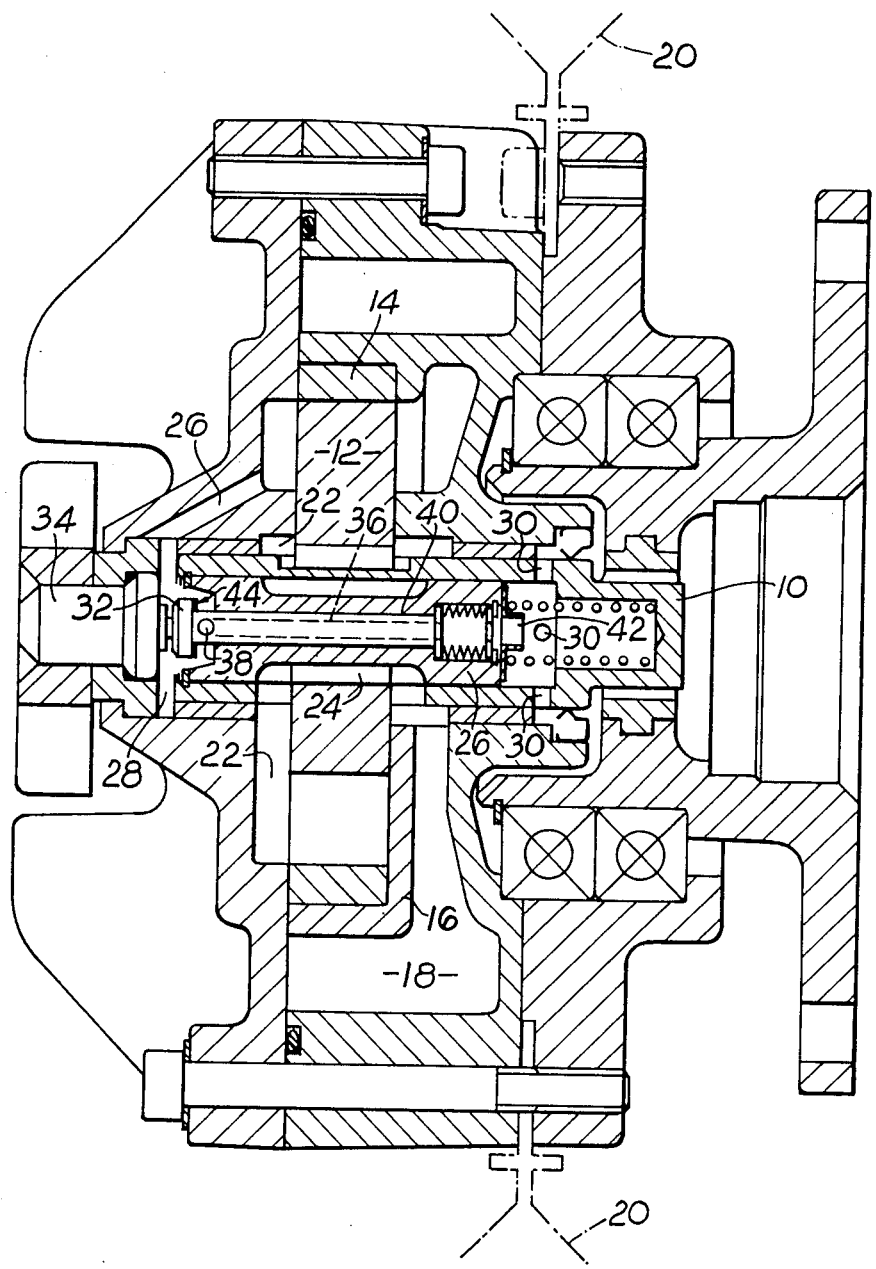

TRANSMISSION COUPLING

This invention relates to cooling systems for internal combustion engines. It is known to use a fan to draw air through a heat-exchanger, and to use electric drive for the fan, switching the drive in and out according to needs, and thus conserving power when the fan is not required.

For larger installations it is known for example from GB No. 2125946 to use a gerotor pump circulating hydraulic fluid continuously and hence turning one part of the pump relative to the other, and then prevent fluid flow by closing a valve thermostatically to lock the parts together for solid drive. The gerotor pump and the hydraulic circuits form a transmission coupling in the fan drive system. In the mentioned patent, the pump is effectively full of the hydraulic fluid and this creates problems in the event of reverse movement, for example if the fan is inadvertently turned backwards by a mechanic who is making some sort of adjustment to the engine, and special provision has to be made to protect the pump against damage in such event by way of a reversing ring, or as in said GB No. 2125946, a relief valve.

According to the present invention, instead of using a gerotor pump which is always full of fluid, the pump is arranged to self-prime from a reservoir, thus enabling the pump to run empty for part of the time and this avoids the need for any special means to overcome the backwards turning problem: two valves are provided in the preferred arrangement according to the present invention namely a first one operating via a bypass which is closed to allow the self-priming, and the second which is equivalent to the thermostatically controlled valve in the mentioned prior art, which is closed to cause the pump parts to lock together for direct drive.

Hence the arrangement according to the present invention will operate in three different modes. Firstly, when the pump is empty and both of the provided valves are open, the pump parts will idle due to frictional drive in the bearings. It is conventional to make the gerotor parts of porous material e.g. sintered powder metal compacts, which retain sufficient oil in their structure to avoid lubrication problems at such times. Typically the fan may idle at say 500 rpm in normal drive conditions when both valves are open.

When the pump has primed due to closure of one of the valves, hydraulic oil is circulated from and to the reservoir via the pump and the fan is driven at an intermediate speed.

When the second valve is also closed, the pump parts lock together and the fan is driven at near shaft speed.

Both valves may be operated sequentially by one and the same thermostat and hence become effective at different parts of a temperature range.

One embodiment of the invention is now more particularly described with reference to the accompanying drawing which is a sectional elevation.

In the drawing the shaft 10 is driven from the engine and keyed to the shaft is rotor 12 which is externally toothed and meshed with internally toothed annulus 14, these two parts 12, 14 providing the gerotor set. The gerotor set is housed in a body part 16 providing a reservoir 18 and itself journalled to turn with the annulus. The fan blades 20 are fixed to this rotatable body part 16.

The outlet passage 22 from the pump extends diametrically of the shaft axis and includes the waist 24 about a spool 26 valve which is slideable in the shaft 10. The spool valve is bored axially to receive a tubular extension 40 of the thermostat rod. This extension is bored axially to provide a fluid path 36 open via a port 38 to the space 28 at one end of the extension, and open at the other end 42 to communicate with radial ports 30. The fluid path 22,24 through the pump is bypassed by a passage system extending from a chamber 28 at one end of the spool valve, the bore 36, open end 42 and ports 30.

A first valve 32 is provided to interrupt flow in said passage system when the valve 32 is moved to the right as shown in the figure. The valve is under the control of a thermostat 34 exposed to the air being drawn through the heat-exchanger matrix by the fan, said movement closes port 38 by displacing rod 40 into the spool valve 26.

The second valve is provided by the spool valve movement. The same thermostat which operates the valve 32 when further displaced also serves to shift the spool 26 so as to move the waist 24 out of alignment with the path 22 and effectively close that path.

In operation, the shaft 10 is driven from the engine, and in the illustrated position the pump is prevented from self-priming by bypass 28, 38, 36, 42, 30, 18. When the temperature rises and the thermostat extends, firstly valve 32 seats against the end of the spool valve and closes the path through it, either by face 44 seating on the spool or as a result of movement of port 38 into the spool, or both. The pump then self-primes drawing fluid from the reservoir and pumping it around and returning it to the reservoir continuously. This drives the fan at a speed intermediate to the idling speed, which is due to frictional drag, and the full speed which is described next.

When the thermostat extends further, the spool valve is shunted to the right as shown in the figure, closing the path 22 and causing the pump parts nearly to lock giving effectively direct drive between the shaft and the fan.

I claim:

1. A thermostatically actuated drive coupling for the cooling fan of an internal combustion engine, comprising a gerotor pump having an input drive shaft with an input pumping rotor mounted thereon, an output pumping rotor connected to drive a fan, a reservoir for fluid, the pump having a suction fluid inlet connected to withdraw fluid from the reservoir and an outlet arranged to discharge fluid into the reservoir, a bypass passage connected to conduct fluid from the outlet to the inlet so as to prevent the pump from self-priming and to cause the pump to run dry without pumping and without driving the output pumping rotor, and a valve located in said passage which is thermostatically actuated upon increase in temperature to close so as to cause the pump to self-prime and drive the output rotor.

2. A coupling as claimed in claim 1 comprising a second valve which is thermostatically actuated in succession to the first valve upon further increase in temperature and is arranged to close the outlet so as to cause the pump to operate against full back pressure so as to cause the output rotor to be carried along with the input rotor.

* * * * *